United States Patent
Titus (10) Patent No.: US 6,570,906 B2
(45) Date of Patent: May 27, 2003

(54) ARC FURNACE WITH DC ARC AND AC JOULE HEATING

(76) Inventor: Charles H. Titus, 323 Echo Valley La., Newtown Square, PA (US) 19073

( * ) Notice: Subject to any disclaimer, the term of this patent is extended or adjusted under 35 U.S.C. 154(b) by 0 days.

(21) Appl. No.: 09/946,885

(22) Filed: Sep. 5, 2001

(65) Prior Publication Data

US 2003/0048828 A1 Mar. 13, 2003

(51) Int. Cl.⁷ .............................. C03B 5/027
(52) U.S. Cl. ................ 373/29; 373/9; 373/40
(58) Field of Search ................ 373/18, 2, 9, 104–105, 373/108, 29, 39, 40, 41; 110/346, 250; 219/121.36, 121.37, 121.52, 121.54

(56) References Cited

U.S. PATENT DOCUMENTS

| | | |
|---|---|---|
| 4,254,298 A | 3/1981 | Svendsen |
| 4,320,245 A | 3/1982 | Gaydon et al. |
| 4,431,612 A | 2/1984 | Bell et al. |
| 4,644,877 A | 2/1987 | Barton et al. |
| 5,280,757 A | 1/1994 | Carter et al. |
| 5,284,503 A | 2/1994 | Bitler et al. |
| 6,127,645 A | 10/2000 | Titus et al. |
| 6,160,238 A | 12/2000 | Titus et al. |
| 6,215,678 B1 | 4/2001 | Titus et al. |

OTHER PUBLICATIONS

The Solid Waste Dilemma: An Agenda for Action—Final Report of Municipal Solid Waste Task Force, Office of Solid Waste, U.S. Environmental Protection Agency, Feb. 1989.

*Primary Examiner*—Tu Ba Hoang
(74) *Attorney, Agent, or Firm*—Caesar, Rivise, Bernstein, Cohen & Pokotilow, Ltd.

(57) ABSTRACT

An arc furnace that utilizes a combined DC arc system and an AC joule heating system to melt the waste disposed therein and to keep the waste material in a molten condition. The DC arc system utilizes the AC joule heating electrodes as part of the DC current path, thereby eliminating the need for a counter DC electrode. Furthermore, the AC joule heating system provides for peripheral and radial AC current flow to neighboring AC joule heating electrodes, thereby creating a stirring effect in the molten waste. This design greatly simplifies the arc furnace control system while providing a more effective thermal control of the molten waste.

32 Claims, 11 Drawing Sheets

ARC FURNACE WITH DC ARC AND AC JOULE HEATING

FIELD OF THE INVENTION

The present invention generally relates to methods and apparatus for the treatment of waste and more particularly to methods and apparatus for the treatment of waste using arc plasma-joule heated melter systems.

BACKGROUND OF INVENTION

The disposal of municipal solid waste (MSW) and other waste has become a major issue over the past few decades due to space limitations for landfills and problems associated with siting new incinerators. In addition, increased environmental awareness has resulted in a major concern of many large metropolitan areas and to the country as a whole to ensure that the disposal of solid waste is properly handled. See e.g., USA EPA, The Solid Waste Dilemma: An Agenda for Action, EPA/530-SW-89-019, Washington, D.C. (1989).

Attempts have been made to reduce the volume and recover the energy content of MSW through incineration and cogeneration. The standard waste-to-energy incinerator will process the solid combustible fraction of the waste stream, produce steam to drive a steam turbine, and as a result of the combustion process produce a waste ash material. Typically, the ash is buried in a municipal landfill. Current trends and recent rulings, however, may require such material to be shipped to landfills permitted for hazardous waste. This will substantially increase ash disposal costs. Moreover, there is increased public concern about gaseous emissions from landfills and the possibility of contamination of groundwater. Another disadvantage associated with incinerator systems is the production of large quantities of gaseous emissions resulting in the need for costly air pollution control systems in an attempt to decrease emission levels to comply with requirements imposed by regulatory agencies.

In order to overcome the shortcomings associated with incinerator systems, attempts have been made in the prior art to utilize arc plasma torches to destroy toxic wastes. The use of arc plasma torches provides an advantage over traditional incinerator or combustion processes under certain operating conditions because the volume of gaseous products formed from the plasma arc torch may be significantly less than the volume produced during typical incineration or combustion, fewer toxic materials are in the gaseous products, and under some circumstances the waste material can be glassified. It should be understood that the phrases "plasma torch" or "plasma arc torch" are incorrectly used by some as interchangeable with "plasma arc"; plasma torch, or plasma arc torches, are not the same thing as a plasma arc and should not be confused with each other. Moreover, a graphite electrode is used in the present invention, as will be discussed in detail later, to avoid many of the problems and complexities of plasma torches or plasma arc torches.

For example, U.S. Pat. No. 5,280,757 to Carter et al. discloses the use of a plasma arc torch in a reactor vessel to gasify municipal solid waste. A product having a medium quality gas and a slag with a lower toxic element leachability is produced thereby. U.S. Pat. No. 4,644,877 to Barton et al. relates to pyrolytic destruction of polychlorinated biphenyls (PCBs) using a plasma arc torch. Waste materials are atomized and ionized by a plasma arc torch and are then cooled and recombined into gas and particulate matter in a reaction chamber. U.S. Pat. No. 4,431,612 to Bell et al. discusses a hollow graphite electrode transfer arc plasma furnace for treatment of hazardous wastes such as PCBs.

A process for remediation of lead-contaminated soil and waste battery material is disclosed in U.S. Pat. No. 5,284,503 to Bitler et al. A vitrified slag is formed from the soil. Combustible gas and volatized lead, which are formed from the waste battery casings, are preferably transferred to and used as a fuel for a conventional smelting furnace.

The systems proposed by Barton et al, Bell et al, Carter et al, and Bitler et al have significant disadvantages. For example, such disadvantages include insufficient heating, mixing and residence time to ensure high quality, nonleachable glass production for a wide range of waste feeds. Additionally, hearth size and feeder design are significantly limited since furnace walls must be relatively close to the arc plasma which is the only heat source. High thermal stress on the walls of the furnace often occurs as a result of the limitation on the hearth size.

Prior art arc plasma furnaces with metal electrodes further may be limited by short electrode lifetime when used at higher DC current. Therefore, to achieve higher power output, the arc potential must be raised by lengthening the arc. This results in radiative thermal losses to the furnace side walls and leads to metal electrode (torch) ineffectiveness. In addition, there are often difficulties associated with prior art transfer arc plasmas in start-up and restarting of such arc plasma systems when cold, nonelectrically conducting material is being processed.

Another disadvantage associated with prior art systems is the inefficient use of combustible gases produced during conversion of waste materials. For example, combustion of gases often does not result in a high conversion rate and is thus inefficient. In addition, the combustion of such gases frequently results in the emission of pollutants such as oxides of nitrogen ($NO_x$) in amounts that render the process environmentally unattractive.

Thus, while such prior art attempts have been useful, there remains a need in the art for a robust, easy to operate waste conversion system which minimizes hazardous gaseous emissions and which maximizes conversion of a wide range of solid waste into useful energy and produces a product stream which is in a safe, stable form for commercial use or which does not require special hazardous waste considerations for disposal.

It would therefore be desirable to provide robust, user friendly and highly flexible methods and apparatus for processing and converting a wide range of waste materials into useful energy and stable products while minimizing hazardous gaseous emissions, thereby overcoming the shortcomings associated with the prior art.

U.S. Pat. Nos. 6,127,645 (Titus et al.), 6,160,238 (Titus et al.) and 6,215,678 (Titus et al.), all of which are incorporated by reference herein, are directed to overcoming these problems by utilizing AC powered joule heating and DC arc electrode melting in arc plasma-joule heated melter systems. However, there still remains a need to accomplish the operation of the AC powered joule heating and DC arc electrode melting in a more efficient way that uses less components.

SUMMARY OF THE INVENTION

An apparatus for waste conversion (e.g., an arc furnace) wherein the apparatus comprises: a tank for receiving the waste; a single electrode for supporting a DC arc to melt the waste in the tank and wherein the single electrode is coupled to a source of DC power; is a plurality of AC joule heating electrodes, coupled to a source of AC power, submerged in the melted waste, that maintains the melted waste in a molten state while simultaneously acting as DC counter electrodes and wherein the plurality of AC joule heating electrodes are coupled to the DC power source.

A method for converting waste wherein the method comprises the steps of: (a) disposing the waste in a tank for treatment; (b) applying a DC arc to melt the waste through a single electrode; (c) applying AC joule heating to maintain the waste in a molten condition through a plurality of AC joule heating electrodes submerged in the waste; and (d) utilizing the plurality of AC joule heating electrodes as DC counter electrodes of the DC arc.

DETAILED DESCRIPTION OF THE PREFERRED EMBODIMENTS

Referring now in detail to the various figures of the drawing wherein like reference characters refer to like parts, there is shown at 20, a scalable DC arc/AC joule heating furnace. The DC arc system melts the waste (e.g., municipal waste, medical waste, etc.) into a molten waste or "glass" (a term used in the waste industry to refer to the melted waste material and not to be confused with the common definition of the word "glass") whereas the AC joule heating system maintains the waste in a molten state. By way of example only, temperatures created by the DC arc system may exist at 6500° C. whereas the temperatures created by the AC joule heating system may exist at 1000° C. to 3000° C.

As will be discussed in detail later, one of the key distinctions between the present invention and conventional arc furnace systems is that the present invention integrates the AC joule heating system with the DC arc system. This totally integrated arc furnace control system provides efficient operation of an arc furnace by allowing the operator to set the operating conditions of both the AC joule heating system and the DC arc system depending on the make-up of the actual waste to be destroyed or portions of the waste that need to be re-used as saleable material for re-use. Thus, based on these factors, the operator can set the proper DC arc voltage, DC arc current, AC joule heating while at the same time reducing the amount of energy that would normally be wasted as when fixed AC/DC system limits are used in other conventional arc furnace systems. In addition, this integrated design greatly reduces the number of electrical components involved in the arc furnace power and control systems.

Figure 1:
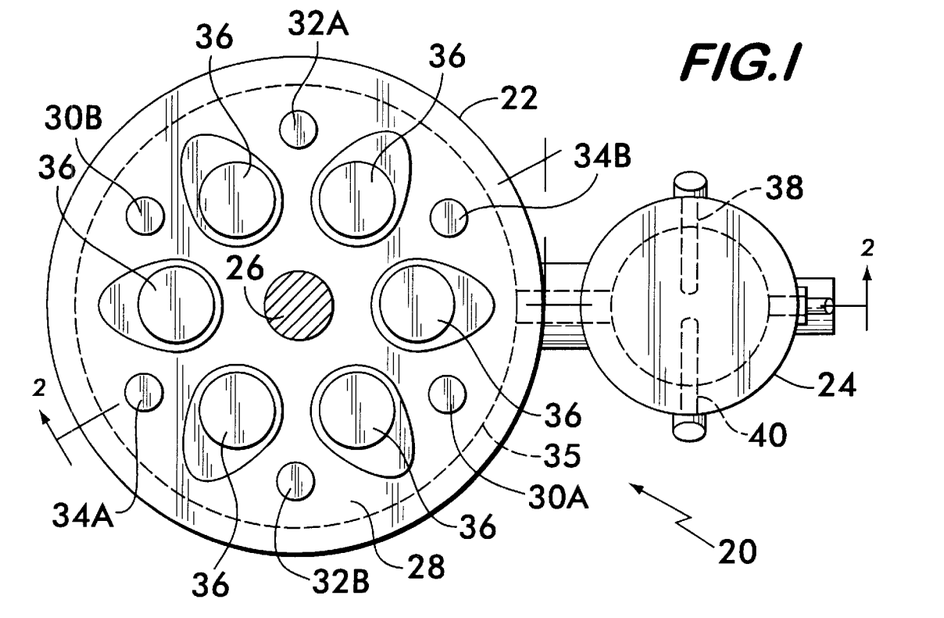
FIG. 1 is a top view of the arc furnace of the present invention showing the spatial orientation of the AC joule heating electrodes, the DC arc electrode and the charge ports for the waste material and a gas treatment section of the arc furnace.
Figure 2:
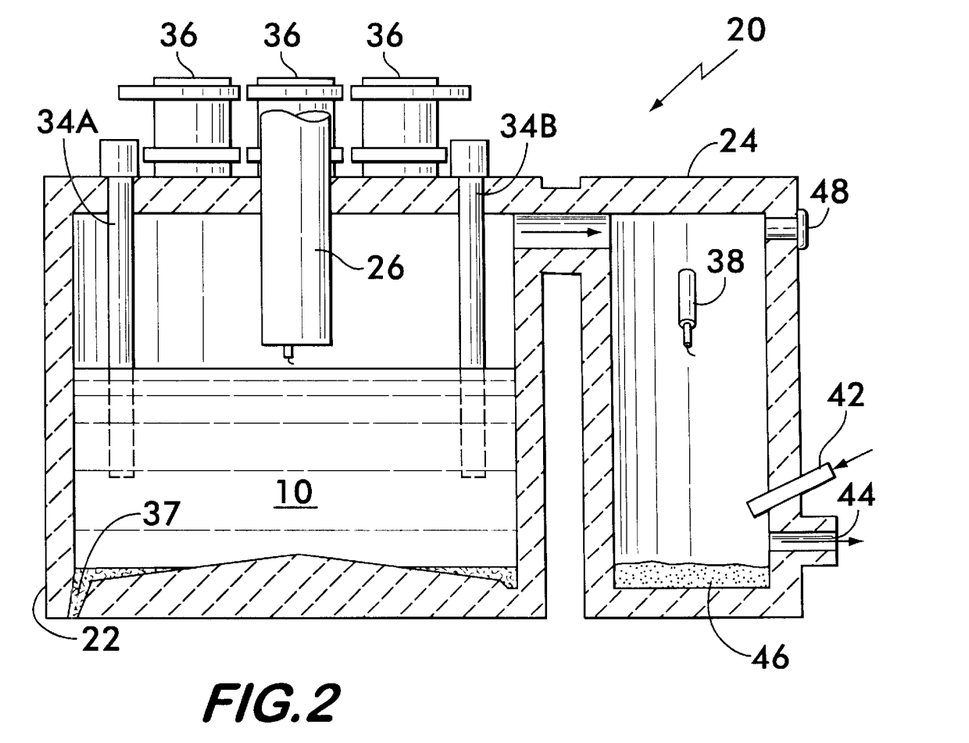
FIG. 2 is a cross-sectional side view of the arc furnace of FIG. 1.

As shown in FIG. 1, the arc furnace comprises a first tank 22 where the waste is melted and an off-gas treatment tank 24 which treats the gas emanating from the melting waste. A DC arc electrode 26 is arranged to be centrally-located in the tank 22 through the roof 28 of the tank 22. A plurality of AC joule heating electrode pairs 30A/30B, 32A/32B and 34A/34B are uniformly and circumferentially distributed around the DC arc electrode 26 in the roof 28. As will be discussed in detail later, the AC joule heating electrodes of any pair are located directly opposite each other, with the DC arc electrode 26 being positioned in between. Each of the AC joule heating electrodes pairs 30A/30B, 32A/32B and 34A/34B are also positioned in between waste charge ports 36. Waste is deposited into the tank 22 by opening these waste charge ports 36 and dropping it through the ports 36. As a result, both the introduced waste (not shown) and the AC joule heating electrodes 30A/30B, 32A/32B and 34A/34B form a "barrier" that prevents thermal energy from the DC arc electrode 26, as will be discussed later, from directly impacting a thermal lining 35 of the tank 22. A metal sump/drain 37 is provided at the base of the tank 22 for removing the melted waste.

Although not shown, it should be understood that the DC arc electrode 26 and all of the AC joule heating electrodes 30A/30B, 32A/32B and 34A/34B are vertically displaceable through the roof 28, i.e., their position relative to the molten waste 10 can be adjusted. In particular, the DC arc electrode 26 is automatically adjusted through drives (not shown) whereas the AC joule heating electrodes 30A/30B, 32A/32B and 34A/34B are manually adjustable.

Figure 3:
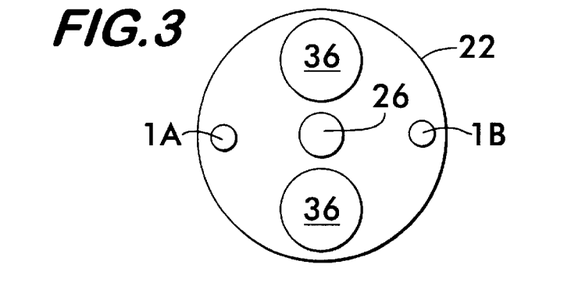
FIG. 3 is a top view of an arc furnace configuration using two AC joule heating electrodes.
Figure 4:
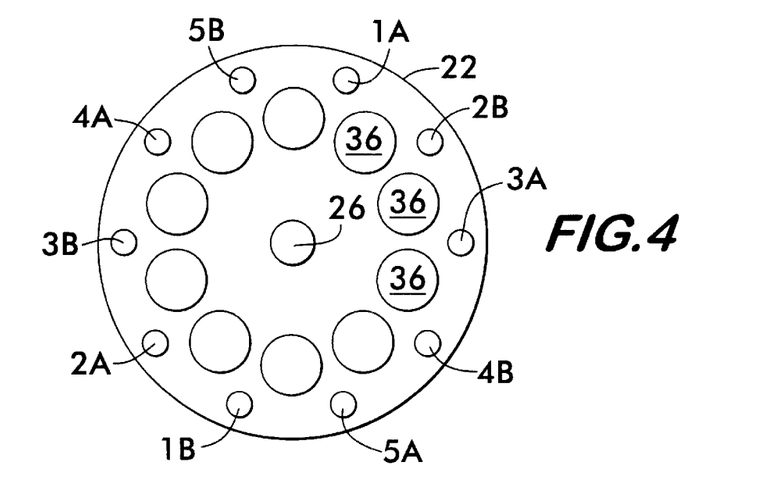
FIG. 4 is a top view of an arc furnace configuration using ten AC joule heating electrodes.
Figure 5:
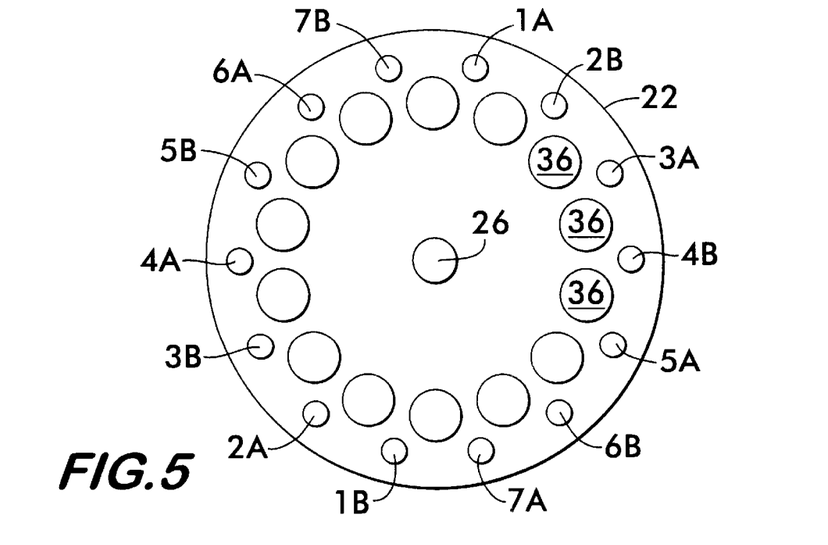
FIG. 5 is a top view of an arc furnace configuration using fourteen AC joule heating electrodes.
Figure 11:
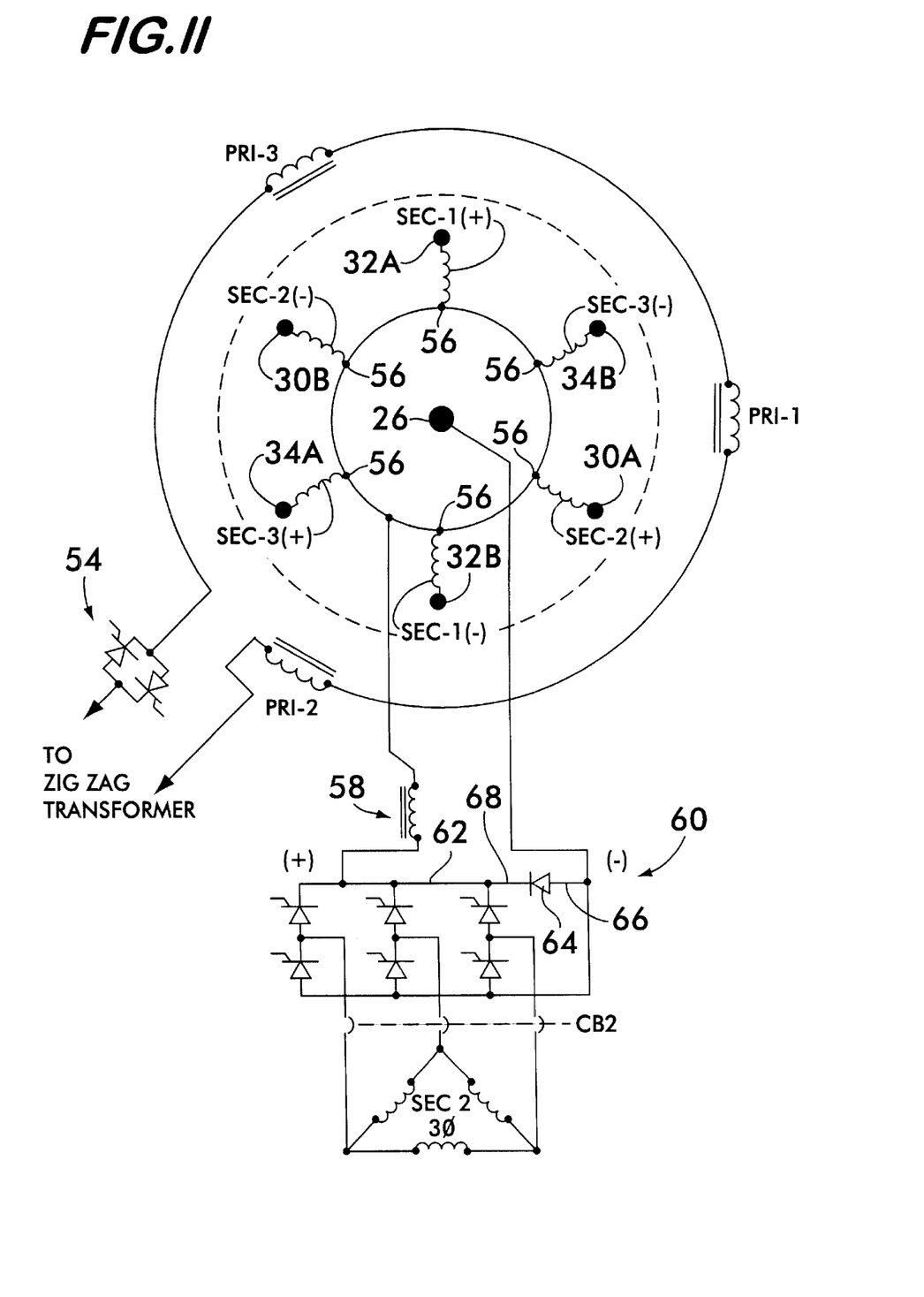
FIG. 11 is an electrical schematic depicting the DC arc system and the AC joule heating system and showing the instantaneous polarities of the various secondary windings.

As shown in FIGS. 3–5, depending on the type of waste and how it is to be treated, different sized arc furnaces are used, thereby having different number of waste charge ports. In all cases, a single, centrally-located DC electrode 26 is used which is uniformally surrounded by an even number of AC joule heating electrodes formed from an odd number of AC joule heating electrodes pairs (1A/1B–7A/7B). In particular, FIG. 3 discloses one set of electrode pairs (1A/1B); FIG. 11 discloses three sets of electrode pairs (30A/30B, 32A/32B and 34A/34B); FIG. 4 discloses five sets of electrode pairs (1A/1B–5A/5B); FIG. 5 discloses seven sets of electrode pairs (1A/1B–7A/7B). As will be discussed in detail later, the importance of the odd number of sets of electrode pairs (or transformers having a pair of secondary windings and whose primary windings are connected in series) permits the instantaneous polarities of neighboring AC joule heating electrodes to be opposite, as shown most clearly in FIG. 11; this can be observed in FIGS. 3–5 where every AC joule heating electrode has an alternating "A" and "B" designator such that there is no "A" next to another "A" nor a "B" next to another "B". In addition, the total number of AC joule heating electrodes corresponds to number of waste charge ports used.

Figure 6:
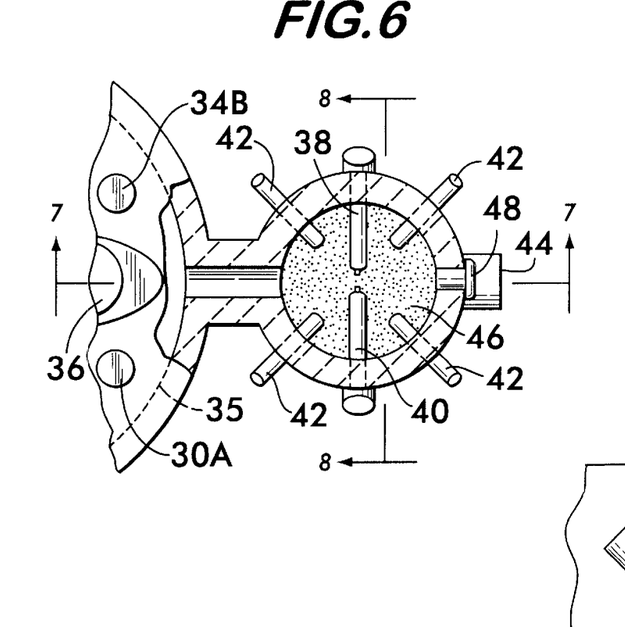
FIG. 6 is a partial cross-sectional view of the an off-gas treatment tank for treating the gas emanating from the melting process.
Figure 7:
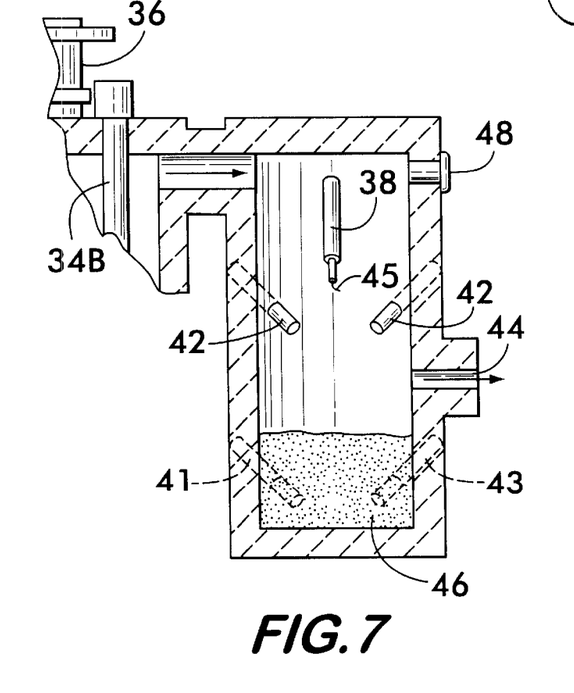
FIG. 7 is a cross-sectional view of the off-gas treatment tank taken along line 7—7 of FIG. 6.
Figure 8:
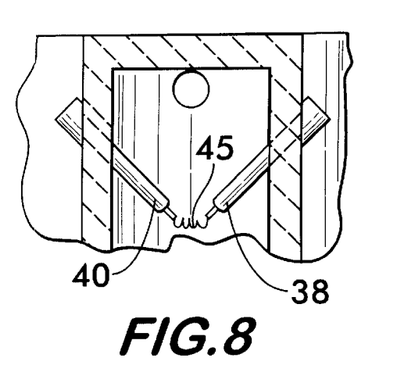
FIG. 8 is a cross-sectional view of the off-gas treatment tank taken along line 8—8 of FIG. 6 with a pair of gas treatment DC electrodes energized.

As mentioned earlier, the arc furnace 20 also comprises an "off gas" treatment tank 24. Since the basic function of the arc furnace 20 is to destroy raw waste, it is desirable to treat the furnace "off-gas" in an adjacent tank 24 designed for this purpose. The off-gas is treating by a pair of gas treatment DC electrodes 38 and 40 and, if needed, AC joule heating electrodes (two of which 41 and 43 are shown in FIG. 7) are provided to maintain the temperature of particulates 46 collecting at the bottom of the tank 24. The DC electrodes 38 and 40 generate a DC arc 45 (FIG. 8) to improve the quality of the off-gas. These electrodes 38/40 are shown pointing downward at an angle in the direction of the gas flow in order to enhance the gas treatment. Steam injectors 42 (FIGS. 6–7) are used to facilitate this treatment with the treated gas being exhausted through a port 44. Particulates 46 that precipitate out of the gas from the treatment are collected at the bottom of the tank 24 which comprises a removable collector (not shown) that can be removed, cleaned and then restored to the tank 24. A clean-out port 48 is also provided for cleaning the tank 24.

It should be noted that subsequent references to the DC arc system and the DC arc electrode refers to the DC arc system and DC arc electrode 26 in the first tank 22; similarly, all subsequent references to AC joule heating system and AC joule heating electrodes refers to the AC joule heating system and the AC joule heating electrodes 30A/30B, 32A/32B and 34A/34B in the first tank 22. The following discussion is directed to the DC arc system and the AC joule heating system of the first tank 22.

The AC joule heating system used in the first tank 22 uses a plurality of transformers, each having a primary winding PRI and a pair of secondary windings SEC (see FIG. 12), with each secondary winding being coupled to a respective joule heating electrode submerged in the melted waste 10. Thus, the notation PRI-1 and SEC-1 indicates transformer#1 having a primary winding a pair of secondary windings. Moreover, as discussed earlier, the AC joule heating electrodes form pairs, 30A/30B, 32A/32B, and 34A/34B which correspond to pairs of secondary windings for a plurality of transformers pair (see FIG. 13). As also mentioned earlier, AC joule heating electrodes pairs 30A/30B, 32A/32B, and 34A/34B are physically located opposite each other, with the DC arc electrode 26 interposed between them (see FIGS. 11 and 13).

As mentioned earlier, depending on the size of the arc furnace, the number of joule heating electrodes is determined. In the present invention 20, three transformers (PRI-1/SEC 1, PRI-2/SEC-2 and PRI-3/SEC-3) are utilized, thereby requiring six joule heating electrodes. Hence, it should be understood that the six joule heating electrodes 30A/30B, 32A/32B, and 34A/34B are by way of example only and that any even number of joule heating electrodes can be used (see FIGS. 3–5). Furthermore, it should be understood that all of the joule heating electrodes 30A/30B, 32A/32B, and 34A/34B are evenly and uniformly distributed around the center DC arc electrode 26. In addition, the joule heating electrodes 30A/30B, 32A/32B, and 34A/34B are arranged such that those electrodes connected to a pair of secondary windings from a common transformer are located opposite each other. The physical location of each electrode is also selected to "fill in" the gap between waste charge ports 36. As can be seen most clearly in FIG. 1, thermal energy radiating from the DC arc electrode 26 in any direction encounters either the waste material (not shown) deposited through the waste charge ports 36 or a joule heating electrode 30A/30B, 32A/32B, and 34A/34B. Thus, there is no direct path from the DC arc electrode 26 to the thermal lining 35 of the tank 22, thereby preserving the life of the lining 35 of the tank 22.

Figure 9:
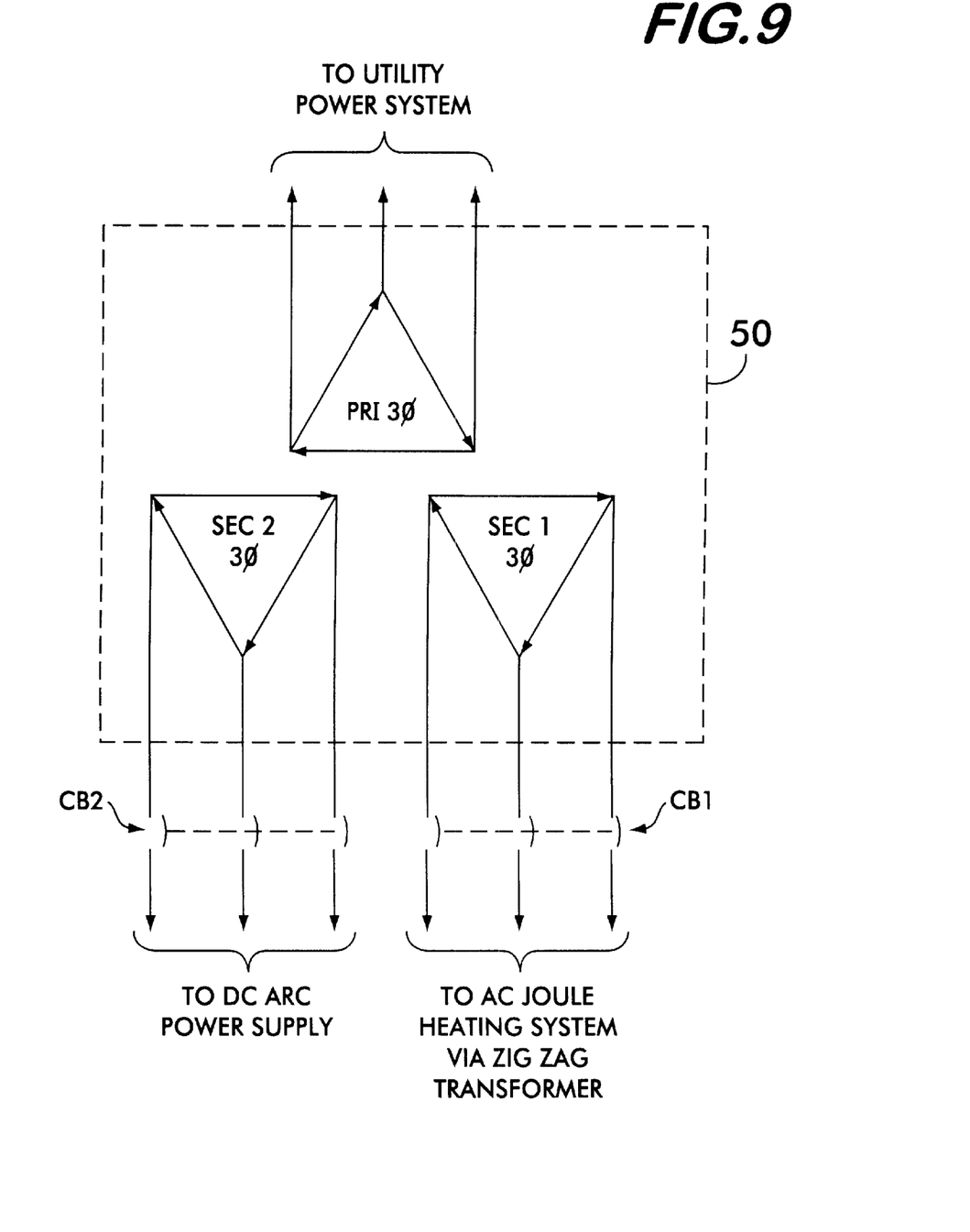
FIG. 9 is a vector diagram of a 3ϕ transformer used for transforming utility power into power usable by the DC arc system and the AC joule heating system.

FIG. 9 shows how electrical power is delivered to both the DC arc system and the AC joule heating system. In particular, 3-phase utility power is connected to the primary windings (PRI 3φ) of a 3-phase transformer 50. Two secondary windings, namely SEC1 3φ and SEC2 3φ, provide 3-phase outputs for the AC joule heating system and the DC arc system, respectively, although the AC joule heating system uses only single phase power, as will be described later. Respective circuit breakers CB1 and CB2 provide emergency shutoff/activation to all 3-phases simultaneously that are available from these secondary windings SEC1 3φ and SEC2 3φ. A Δ-configuration is shown for both the primary PRI 3φ and secondary SEC1 3φ/SEC 2 3φ windings. It should be noted that although the primary 3φ winding is shown as a Δ-configuration, a Y-configuration would work just as well; however, it should be understood that both secondary 3φ windings must be Δ-configurations if the primary 3φ winding is a Y-configuration. By way of example only, the output of the SEC1 3φ may comprise 240VAC$_{L-L}$ and the output of the SEC2 3φ may comprise 480VAC$_{L-L}$.

Figure 10:
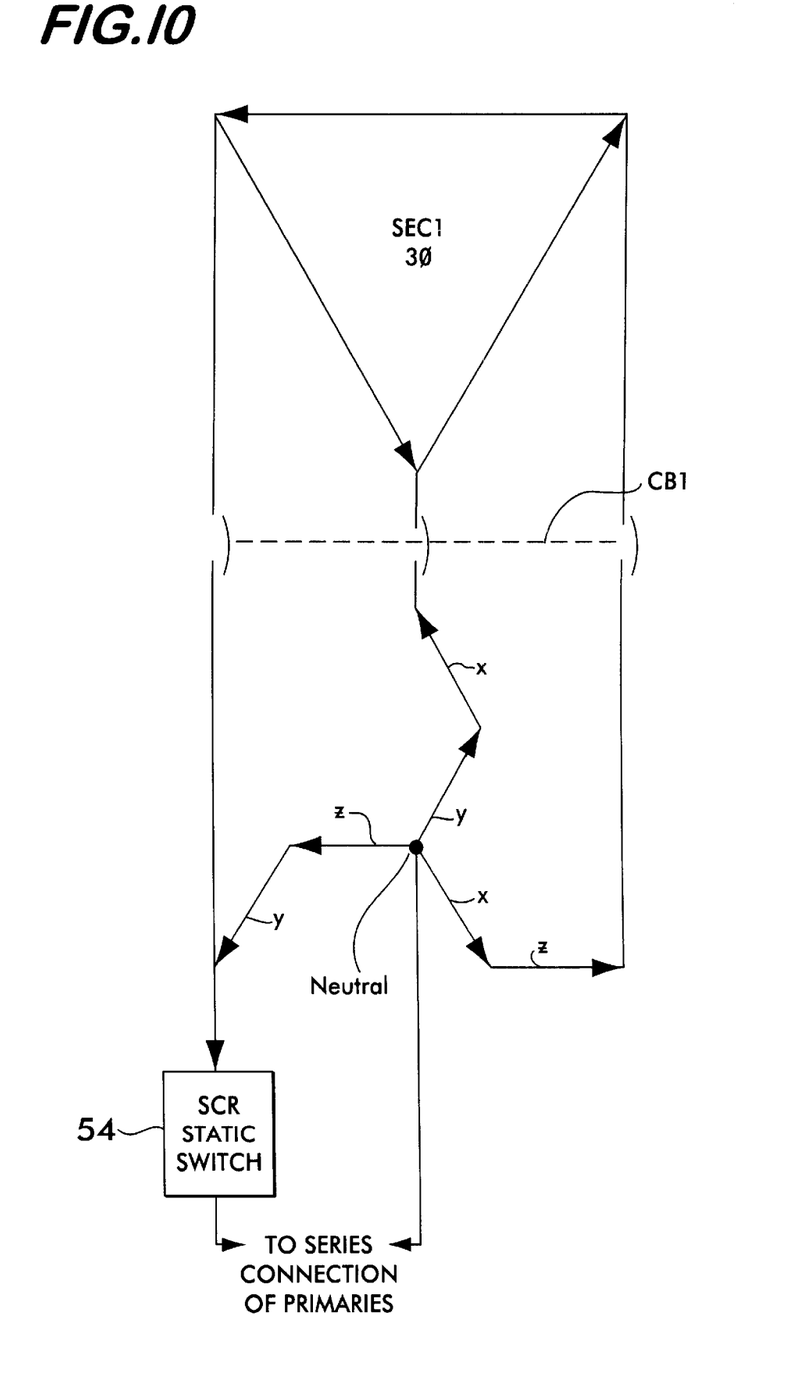
FIG. 10 is a vector diagram of a zig-zag transformer that provides single phase AC power to the AC joule heating system from the 3ϕ transformer.

The DC arc system (FIG. 11) uses the 3-phases for powering the DC arc electrode 26 whereas the AC joule heating system utilizes a zig-zag transformer 52 (FIG. 13) to obtain single phase power for the AC joule heating system. In particular, as shown in FIG. 10, and as is well-known in the art, the zig-zag transformer 52 balances the current on each of the phases in the Δ-configuration of SEC2 3φ. As can be seen, the vector contribution of each phase (e.g., x for the first phase, y for the second phase and z for the third phase) is cancelled by a corresponding equal and opposite vector. Thus, single phase power, including a neutral, is thus obtained for powering the AC joule heating system.

FIG. 11 shows the combined AC joule heating system and DC arc system. In particular, single phase power, from the zig-zag transformer 52, is provided to all of the primary windings (PRI-1, PRI-2 and PRI-3) in the three transformers which are connected in series. This series connection assures that all primary and secondary windings are carrying and delivering the same magnitude of AC current to all joule heating electrodes 30A/30B, 32A/32B, and 34A/34B. It should be noted that an SCR (silicon-controlled rectifier) static (i.e., no moving parts) switch 54 is coupled between the zig-zag transformer 52 and the primary windings. This SCR static switch 54 allows the operator to control the current level in the AC joule heating system, thereby allowing the operator to control the temperature of the molten waste 10 in the arc furnace.

As can also be seen from this schematic, one end 56 of each secondary winding is connected to the DC arc system, through a DC reactor 58 (the importance of which will be discussed later), while the other end of each secondary winding is connected to a respective joule heating electrode submerged in the molten waste 10. The other side of the DC reactor 58 is coupled to the positive terminal of a DC power supply 60 of the DC arc system. Although not required, the DC arc electrode 26 is connected to the negative terminal of the DC arc power supply 60. The DC arc power supply 60 basically comprises an SCR (silicon controlled rectifier) bank, whose input is coupled to three-phase power from the SEC2 3φ windings and whose rectified DC output is provided at the positive and negative terminals indicated in FIG. 11. The operator can set both the DC arc current (e.g., phase-control firing of the SCRs) and the DC arc voltage via the DC arc power supply 60. With particular regard to setting the DC arc voltage, as is well known in the art, the physical positioning of the free end of the DC arc electrode 26 determines the DC arc voltage. Thus, for example, if the operator were to set the DC arc voltage at some predetermined arc voltage, $Voltage_{DC\ ARC}$, (depending on the type and density of the waste, whether there is to re-usable waste created therefrom, etc.), a control system (not shown, but may include one such as described in U.S. Pat. No. 4,320,245 (Gaydon et al.) which is incorporated by reference herein) is used to slowly move the DC arc electrode 26 from its initial position (the free end just making contact with the molten waste 10) upward, away from the surface of the molten waste 10 until the set DC arc voltage is achieved. The DC arc electrode 26 is preferably cylindrical and composed of graphite. The diameter of the DC arc electrode 26 increases as the inside diameter of the tank lining 35 increases but not necessarily in direct proportion to the increase of the diameter of the tank lining 35. As mentioned earlier, the DC arc electrode 26 is mounted in the center of the roof 28 of the tank 22 whose refractory lining 35 is preferably cylindrical and is concentric with the DC arc electrode 26.

One of the unique features of the present invention is the use of the DC reactor 58 which provides DC arc stability. The DC reactor 58 stores the requisite energy to maintain the DC arc voltage should the actual DC arc voltage fall below the set level, $Voltage_{DC\ ARC}$.

Phase control retardation of the DC arc current may increase the length of time when the arc voltage is greater than the DC rectifier 58 output voltage. It is during this time interval when the DC reactor 58 delivers its stored energy to the DC arc, thereby maintaining a steady DC arc. In particular, when $Voltage_{DC\ REC} \geq Voltage_{DC\ ARC}$, then the DC arc power supply 60 is powering the arc and energy is being stored in the DC reactor 58; conversely, when $Voltage_{DC\ REC} < Voltage_{DC\ ARC}$ then the DC reactor 58 is discharging and supplying energy to the DC arc, to maintain the DC arc. When the DC reactor 58 is supplying the arc with power, a return path 62 (FIG. 11) is provided to the DC reactor 58. However, to avoid shorting the DC arc power supply 60 (i.e., when the DC arc power supply 60 is powering the arc) through the return path 62, a diode 64 is placed therein and it is back-biased with respect to the DC arc power supply 60 (e.g., the anode 66 of the diode 64 is coupled to the negative terminal of the DC arc power supply and the cathode 68 of the diode 64 is coupled to the positive terminal of the DC arc power supply 60).

Figure 12:
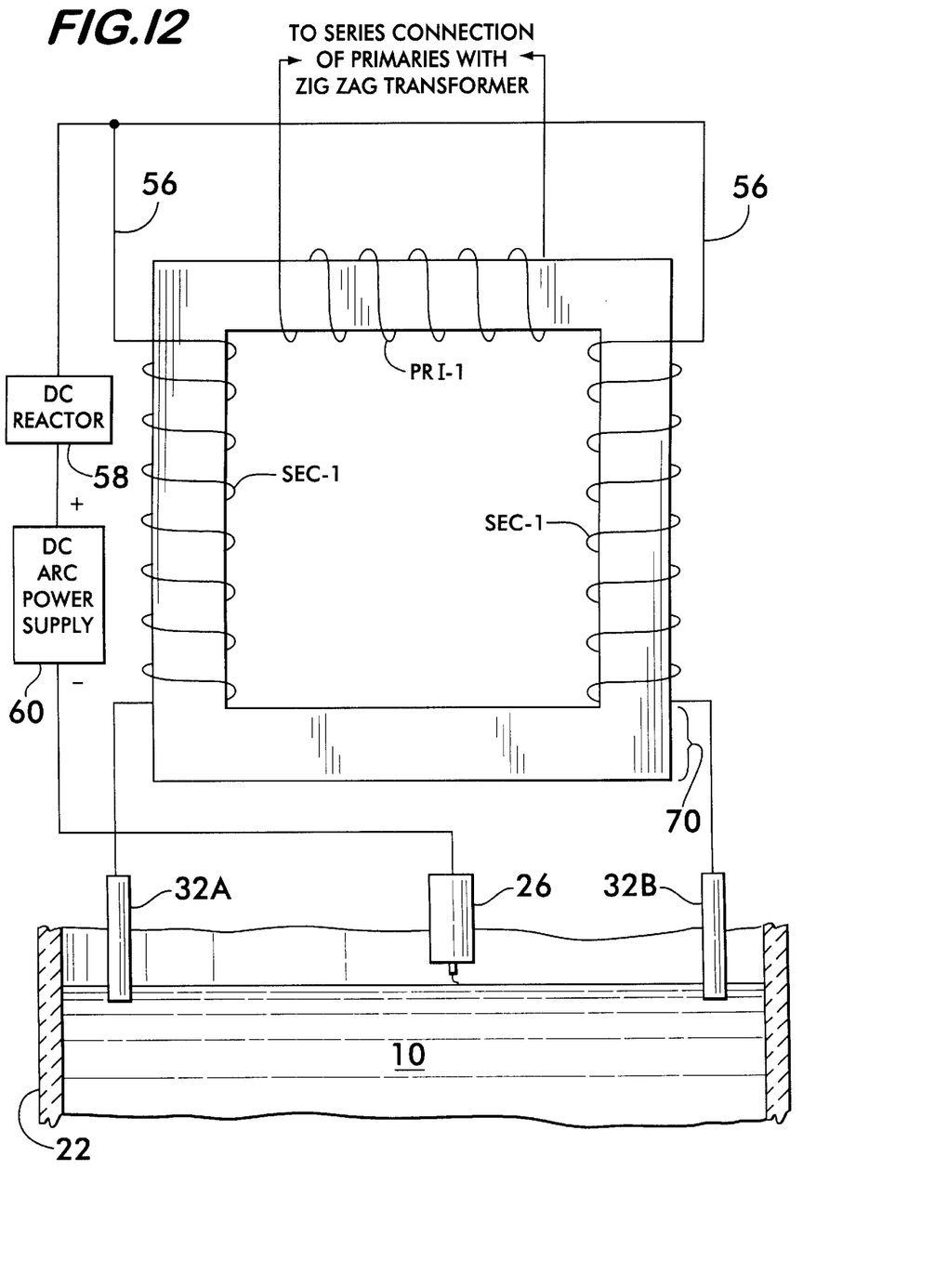
FIG. 12 is a functional diagram of one of three example "U" core type, single phase transformers used in both the DC arc electrode system and the AC joule heating system.
Figure 14:
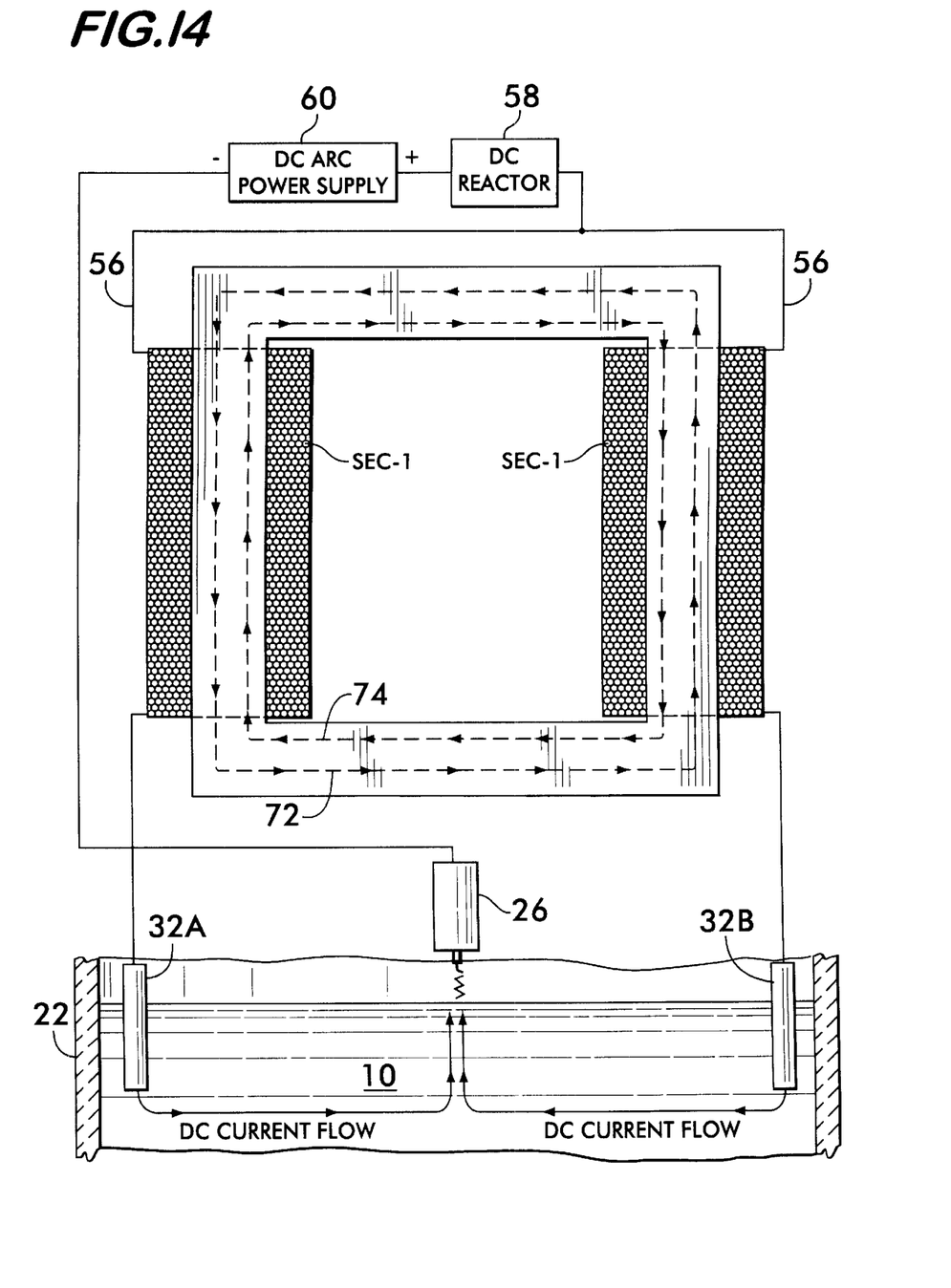
FIG. 14 is a partial cross-sectional view of the single phase transformer of FIG. 12 showing how the magnetic fluxes, caused by DC current flowing through the secondary windings, cancel each other.

FIG. 12 depicts a functional diagram of one of the three transformers used in the present invention 20. As mentioned earlier, the number of transformers varies depending on the size of the arc furnace and the waste material being melted. Furthermore, FIG. 12 depicts the use of a "U" core transformer whereby the various windings are mounted around a "U" shaped magnetic core which is then closed off by a fourth leg 70. In particular, as shown in FIG. 12, the single phase primary winding (PRI-1) is wound around one leg of the magnetic core while the two secondary windings (SEC-1) are wound around opposing legs of the magnetic core. It should be understood that the each of the secondary windings shown comprise the same size conductor and the same number of windings but are wound in such directions that the AC voltages are additive while the DC fluxes cancel each other. This is important, as mentioned earlier, to achieve the opposing magnetic fluxes due to the DC current flowing in each secondary winding. As shown in FIG. 14, when the DC arc current is flowing through the DC arc system, the magnetic fluxes created by each secondary coil cancel each other, as indicated by the arrows 72 and 74; this canceling effect of the magnetic fluxes avoids saturating the magnetic core. DC current flows from the DC arc power supply 60, through each secondary winding, down through a respective joule electrode, through the surface of the molten waste and up through the DC arc electrode to form the arc, back through the DC reactor 58 and back to the DC arc power supply 60. Thus, the joule heating electrodes act as "DC counter electrodes".

Figure 13:
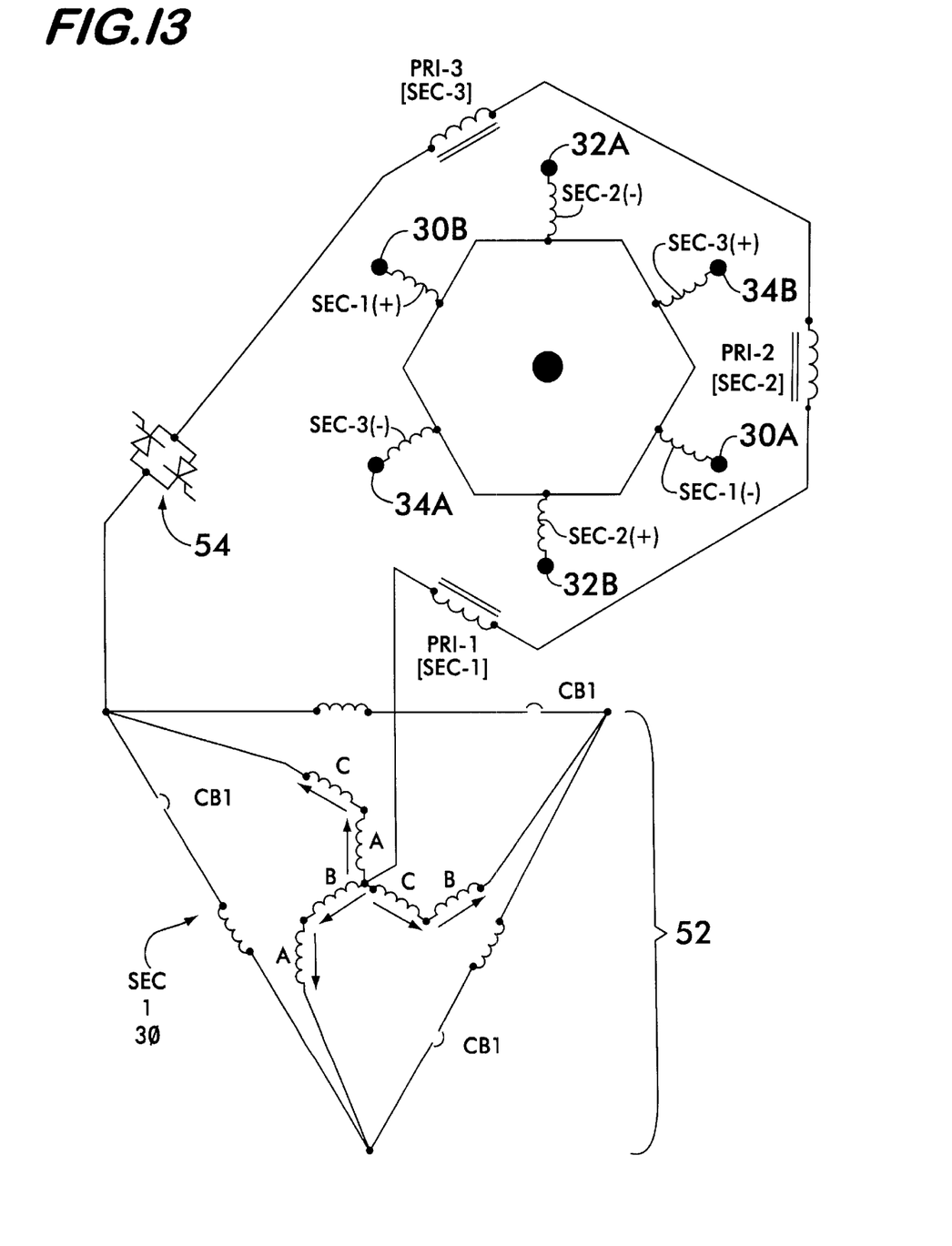
FIG. 13 is an electrical schematic of the zig-zag transformer and the AC joule heating system and shows the instantaneous polarities of the various secondary windings.

FIG. 13 depicts an instantaneous "snapshot" of just the AC joule heating system, showing the instantaneous polarities of the various secondary windings (SEC) when the primary winding (PRI) is carrying AC current therein. With AC current induced from the primary winding and flowing through the secondary windings, AC current flow occurs between corresponding joule heating electrodes. For example, at the instant of time shown in FIG. 13, AC current flow in one transformer flows from the joule heating electrode connected to the positive terminal SEC-1, through the molten waste, to the joule heating electrode connected to the negative terminal SEC-1. Moreover, AC current flow from the joule heating electrode connected to the positive terminal SEC-1 also flows through the molten waste to joule heating electrodes coupled to the negative joule heating electrode connected to SEC-2 as well as to the negative joule heating electrode connected to SEC-3. Similarly, AC current flows from the positive joule heating electrodes coupled to SEC-2 and SEC-3 towards the negative joule heating electrode SEC-1. Simultaneously, AC current flowing in another transformer flows from the joule heating electrode connected to the positive terminal SEC-2, through the molten waste, to the joule heating electrode connected to the negative terminal SEC-2. But in addition, AC current flow from that transformer is also to the neighboring joule heating electrodes connected to SEC-1 and SEC-3. Thus, not only is there AC current flow between corresponding secondary winding pairs, but there is also AC current flow between other transformer secondary windings which assist in "stirring" the thermal energy of the molten waste. Thus, another key feature of the present invention over the conventional AC joule heating systems is that AC current flow is not restricted to transformer secondary winding pairs, but to opposite polarity neighboring joule heating electrodes.

The joule heating electrodes also comprise graphite and are preferably smaller than the DC arc electrode 26. As mentioned earlier, each of the joule heating electrodes are equally spaced circumferentially and are radially located between the DC electrode and the inside of the arc furnace lining.

Figure 15:
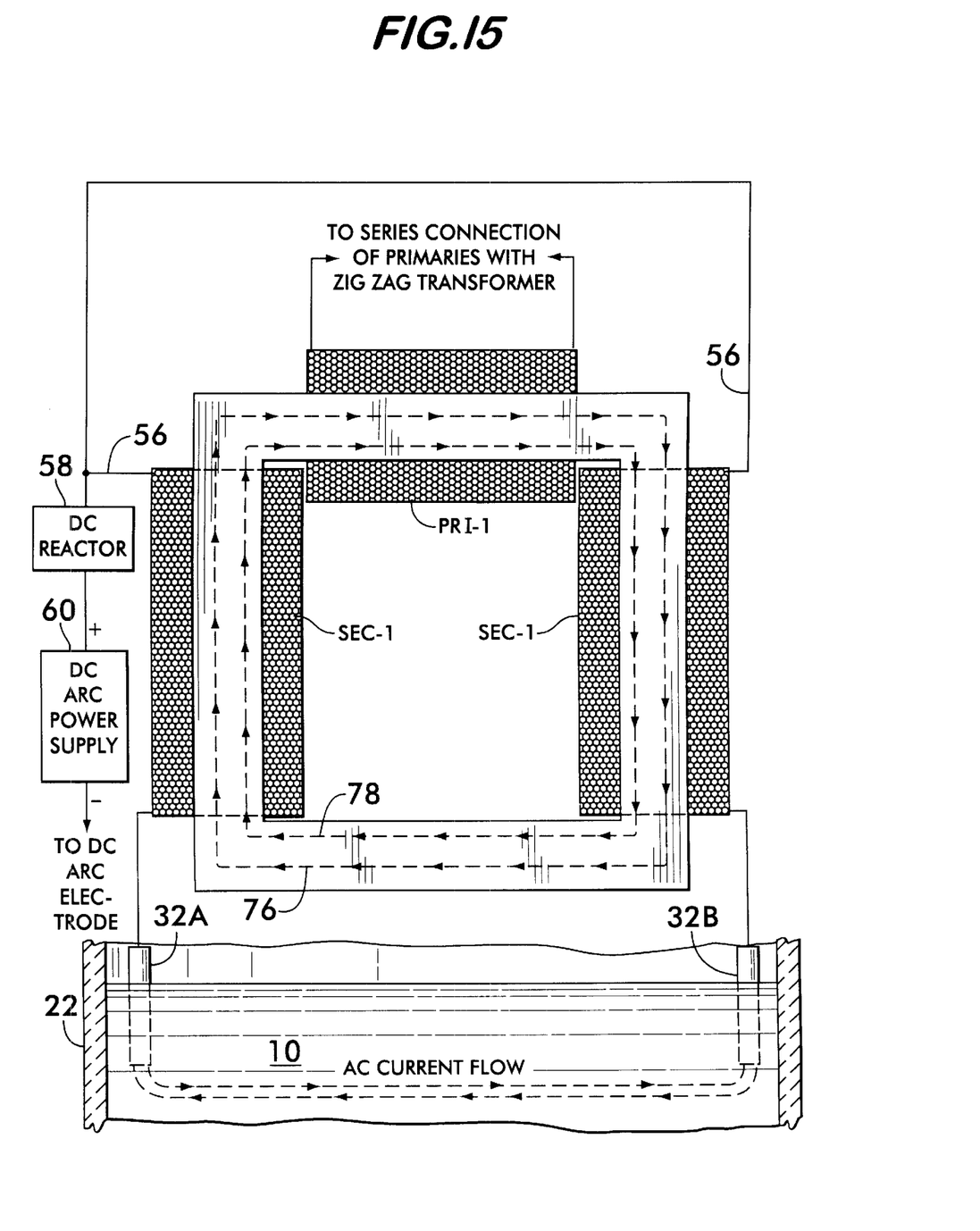
FIG. 15 is a partial cross-sectional view of the single phase transformer of FIG. 12 showing the magnetic fluxes, caused by AC current flowing in the primary winding and induced in the secondary windings, add to each other.

Furthermore, as shown in FIG. 15, when AC current is flowing through the secondary windings, the magnetic fluxes generated by the AC current flows are additive (as indicated by the arrows 76 and 78), as are the AC voltages in the secondary windings.

Figure 16:
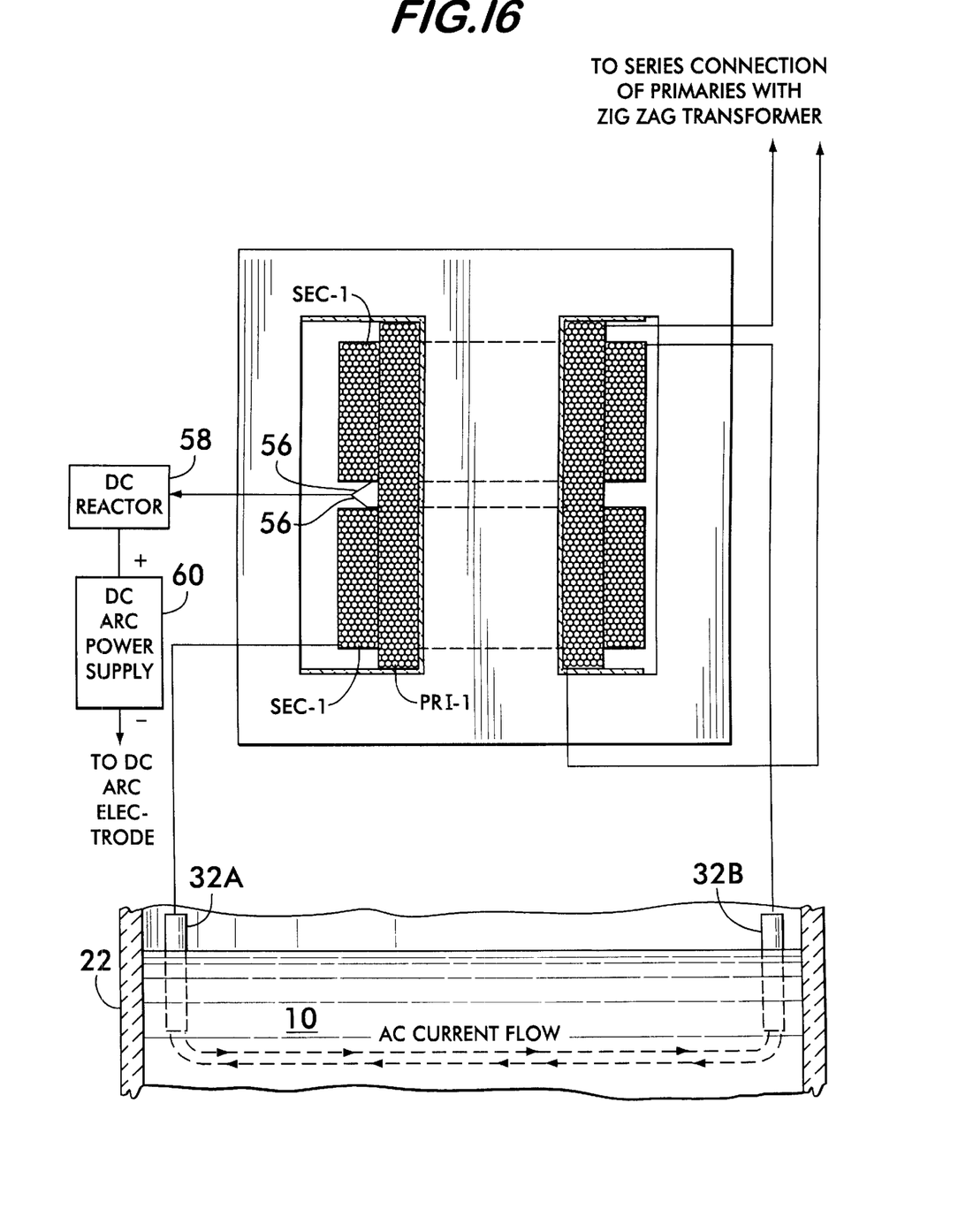
FIG. 16 is a cross-sectional view of another exemplary single phase transformer used in both the DC arc electrode system and the AC joule heating system.

FIG. 16 depicts an alternative type of transformer based on an "E" core wherein the original shape of the magnetic core is an "E" shape. The primary winding is first wound around the central leg of the "E" core; an insulator is then wrapped around the primary coil. Next, a first secondary winding is wound around the upper part of the central leg while a second secondary winding is wound around the lower part of the central leg. Once wound, the open side of the "E" shape is closed off to form a closed path magnetic core. It should be understood that the central leg comprises twice the width of either of the outer parallel legs for proper magnetic flux flow. In all other aspects, the transformer depicted in FIG. 9 is electrically connected to the DC arc power supply system and the AC joule heating system as discussed previously. Moreover, as with the "U" core transformer, the secondary windings of this alternative transformer also comprise the same number of windings and the same size conductors and are wound around the "E" core such that the magnetic fluxes created by each secondary coil when DC current is flowing cancel each other and the magnetic fluxes created by induction when AC current is flowing in the corresponding primary are additive.

As mentioned earlier, with regard to the AC joule heating electrodes, AC current not only flows between corresponding AC joule heating electrodes, e.g., 30A/30B, underneath the DC arc electrode 26 but also to neighboring AC joule heating electrodes of opposite polarity (see FIG. 13). However, it should be understood that it is within the broadest scope of the present invention to include AC current flow between neighboring AC joule heating electrodes without the need to have AC current flow between corresponding AC joule heating electrodes. For example, using the instantaneous polarities shown in FIG. 13, it is within the broadest scope of the present invention to have AC current flow between electrodes 30A and 32B and 34B but without having AC current flow between electrodes 30A/30B.

As can be appreciated from the foregoing, the present invention:
utilize joule heating electrodes that simultaneously act as independent AC joule heating electrodes and DC counter electrodes without electrical interference, i.e., there is no DC and AC interaction;
requires only one DC arc electrode and electrode control device regardless of the size of the arc furnace;
requires only one conventional DC arc power supply;
utilizes joule heating electrodes that simultaneously serve two purposes, as conventional AC joule healing electrodes and as DC arc counter electrodes;
operates regardless of how small or how large the arc furnace may be, and that the invention requires only one DC power supply, one SCR type static switch (needed to control the AC joule heating current to any number of joule heating electrodes) and one AC power supply; the only thing that changes is the amount of power each of these power supplies must deliver;
utilizes the joule heating electrodes as DC arc counter electrodes which also is beneficial in that the magnetic $\vec{J} \times \vec{B}$ forces (where $\vec{J}$ is the current density and $\vec{B}$ is the magnetic field) causes the DC arc to remain under the bottom of the DC arc electrode, thereby reducing the furnace lining damage;
uses a physical configuration of one DC arc electrode in the center of the furnace and a number of AC joule heating/DC arc counter electrodes near the inside of the furnace lining, thereby providing considerably more space for raw waste and wherein the joule heating electrodes aid in shielding the furnace lining from arc radiation.

supports the ideal configuration for raw waste destruction: a "doughnut" of waste between the DC arc electrode and the joule heating electrodes;
provides for joule heating/DC counter electrodes that can be replaced more easily than a DC counter electrode on top of, or as an integral part of the bottom furnace lining, thereby resulting in another cost saving and customer benefit.

Without further elaboration, the foregoing will so fully illustrate my invention that others may, by applying current or future knowledge, readily adopt the same for use under various conditions of service.

I claim:

1. An apparatus for waste conversion said apparatus comprising:
    a tank for receiving the waste;
    a single electrode for supporting a DC arc to melt the waste in the tank, said single electrode being coupled to a source of DC power;
    a plurality of AC joule heating electrodes, inductively-coupled to a source of AC power, submerged in the melted waste, that maintain the melted waste in a molten state while simultaneously acting as DC counter electrodes, said plurality of AC joule heating electrodes being coupled to said DC power source.

2. The apparatus of claim 1 wherein said plurality of AC joule heating electrodes are coupled to said source of AC power via a plurality of transformers, each of said transformers comprising:
    a primary winding and a pair of secondary windings wound around a magnetic core;
    wherein each one of said pair of secondary windings comprises a first end coupled to a respective AC joule heating electrode and wherein each one of said pair of secondary windings comprises a second end coupled to said DC power source;
    wherein each one of said pair of secondary windings comprises the same number of turns and the same size conductor but each wound in a direction for cancelling a DC magnetic flux in said magnetic core when DC current flows in said pair of secondary windings.

3. The apparatus of claim 2 wherein said primary windings of said plurality of transformers are coupled in series.

4. The apparatus of claim 3 wherein said plurality of transformers comprises an odd number.

5. The apparatus of claim 2 wherein AC voltages induced in said pair of secondary windings from said energized primary winding are additive.

6. The apparatus of claim 3 wherein each of one of said second ends of said secondary windings are coupled to said source of DC power via a DC reactor.

7. The apparatus of claim 6 wherein said source of DC power comprises a SCR-type rectifier having a positive and negative output, said DC reactor being coupled to said positive output.

8. The apparatus of claim 7 further comprising a diode, having an anode and a cathode, connected across said positive and negative outputs of said rectifier, said anode being connected to said negative output and said cathode being coupled to said positive output.

9. The apparatus of claim 3 wherein said series connected primaries are coupled to said source of AC power via a SCR static switch, said switch permitting an operator to control the temperature of the molten waste.

10. The apparatus of claim 1 wherein said single electrode is displaceable with respect to the waste introduced into said tank.

11. The apparatus of claim 1 wherein said single electrode is vertically displaceable with respect to the waste introduce into said tank.

12. The apparatus of claim 1 wherein said plurality of AC joule heating electrodes are equally-spaced circumferentially around said single electrode coupled to a source of DC power.

13. The apparatus of claim 12 wherein said plurality of AC joule heating electrodes comprises an odd number multiplied by two.

14. The apparatus of claim 2 wherein said plurality of AC joule heating electrodes are equally-spaced circumferentially around said single electrode coupled to a source of DC power.

15. The apparatus of claim 14 wherein said plurality of AC joule heating electrodes comprises an odd number multiplied by two.

16. The apparatus of claim 11 wherein AC current passes between AC joule heating electrodes, of other transformers, of opposite polarity.

17. The apparatus of claim 13 wherein AC current passes between respective AC joule heating electrodes coupled to a pair of secondary windings and passes to AC joule heating electrodes, of other transformers, of opposite polarity.

18. The apparatus of claim 1 wherein said source of AC power comprises single phase AC power.

19. The apparatus of claim 6 wherein said SCR-type rectifier comprises an input coupled to three phase AC power.

20. The apparatus of claim 2 wherein said magnetic core is a "U" core.

21. The apparatus of claim 2 wherein said magnetic core is an "E" core, said "E" core having a middle member that is twice the width of the upper member width and the lower member width.

22. The apparatus of claim 14 wherein said tank comprises a roof with waste charge ports for introducing waste therein, said waste charge ports and said plurality of AC joule heating electrodes being arranged such that thermal radiation radiating from said single electrode is blocked access to said thermal lining either by waste introduced through said waste charge ports or said plurality of AC joule heating electrodes.

23. The apparatus of claim 22 wherein the number of waste charge ports corresponds to said plurality of AC joule heating electrodes, said plurality of AC joule heating electrodes comprising an odd number multiplied by two.

24. A method for converting waste, said method comprising the steps of:

(a) disposing the waste in a tank for treatment;

(b) applying a DC arc to melt the waste through a single electrode by coupling said single electrode to a DC power source and adjusting the position of one end of said single electrode with respect to the waste to support said DC arc;

(c) applying AC joule heating to maintain the waste in a molten condition through a plurality of AC joule heating electrodes submerged in the waste; and (d) utilizing said plurality of AC joule heating electrodes as DC counter electrodes of said DC arc by:

(1) providing a plurality of transformers, each having a primary winding, a pair of secondary windings and a magnetic core, said primary windings being coupled in series to an AC power source and wherein each pair of secondary windings is magnetically coupled to a respective primary winding;

(2) winding each pair of secondary windings around said magnetic core with the same number of turns and the same size conductor but winding each one of the pair of secondary windings in a direction for cancelling a DC magnetic flux in said magnetic core when DC current flows in each pair of secondary windings; and (3) connecting a first end of each one of said pair of secondary windings to said DC power source and connecting a second end of each one of said pair of secondary windings to a respective AC joule heating electrode.

25. The method of claim 24 wherein said step of providing a plurality of transformers comprises a providing an odd number of transformers.

26. The method of claim 24 wherein said step of connecting a first end of each one of said pair of secondary windings to said DC power source comprises coupling said first end to said DC power source via a DC reactor.

27. The method of claim 26 wherein said DC power source comprises a positive and a negative output and wherein said step of coupling said first end to said DC power source via DC reactor comprises coupling said DC reactor to said positive output.

28. The method of claim 24 wherein said step of coupling said primary windings to an AC power source comprises coupling said primary windings to said AC power source via an SCR static switch for permitting an operator to control the temperature of the molten waste.

29. The method of claim 24 wherein said step of applying AC joule heating comprises passing AC current between AC joule heating electrodes, of other transformers, of opposite polarity.

30. The method of claim 24 wherein said step of coupling to an AC power source comprises connecting said primary windings to single phase AC power.

31. The method of claim 24 wherein said step of winding each pair of secondary windings comprises winding each pair of secondary windings around a respective leg of said magnetic core.

32. The method of claim 24 wherein said step of winding each pair of secondary windings comprises winding each pair of secondary windings around a common leg of said magnetic core.

* * * * *